April 23, 1968 J. F. CHANDLER ETAL 3,379,923

CONVERGENCE CORRECTION

Filed Feb. 9, 1965

Inventors
James F. Chandler
John L. Rennick
By [signature] Atty.

3,379,923
Patented Apr. 23, 1968

3,379,923

CONVERGENCE CORRECTION

James F. Chandler, Chicago, and John L. Rennick, Elmwood Park, Ill., assignors to Zenith Radio Corporation, Chicago, Ill., a corporation of Delaware Filed Feb. 9, 1965, Ser. No. 431,410
11 Claims. (Cl. 315—13)

ABSTRACT OF THE DISCLOSURE

Convergence correction apparatus for multibeam color picture tubes includes an electromagnetic structure comprising a U-shaped core of magnetic material and a pair of coils individually disposed on assigned ones of the core legs. The coils respond to dynamic convergence signals of a predetermined frequency to develop a convergence magnetic field between the free ends of the core legs. Each of the coils has an effective inductive reactance and a distributed capacitance constituting a parallel circuit resonant at a second predetermined frequency. Energy dissipating means is coupled individually to each of the coils to reduce the current flow therein at the second predetermined frequency.

The present invention relates to color television and more particularly to magnetic convergence apparatus for use with multibeam color picture tubes.

In color television receivers and other systems using multibeam cathode-ray tubes, proper operation requires that the several beams be converged to a common point on the luminescent screen. Both static and dynamic convergence are normally required. Static convergence is often accomplished through the use of permanent magnets, which cooperate with suitable internal pole pieces in the color kinescope and are so adjusted that the resulting static magnetic fields converge the electron beams, in the absence of scanning fields, at the center of the luminescent screen. Dynamic convergence fields are conventionally established by electromagnets which also cooperate with the internal pole pieces and are responsive to applied convergence signals which vary as a function of scanning deflection. The required magnets are usually assembled to form a common convergence yoke which is adapted for both rotational and longitudinal adjustment on the neck of the color picture tube.

Many conventional convergence apparatus when employed in use on a color television receiver have caused certain distortions in the color picture raster. One such difficulty has been the generation of S distortion, or a waviness in the individual lines of the raster, which distortion is particularly pronounced across the raster center. Such distortion reduces color purity and raster clarity.

The principal object of this invention is to provide a new and improved convergence apparatus for use with a multibeam cathode-ray tube.

Another object is to provide a convergence apparatus in which raster distortion is materially reduced.

It is also an object of the invention to provide a magnetic convergence apparatus in which raster distortion is materially reduced and yet which is of economical and simplified construction.

After an extensive search for the cause of the particular raster distortion mentioned above it has been discovered that a material cause of raster distortion stems from the existence of leakage flux produced by each one of the commonly used pair of dynamic convergence coils of the convergence apparatus. This disturbing leakage flux is generated by a self-resonance of the individual coils at a frequency induced in these coils by the closely situated scanning coils.

The invention is embodied in convergence apparatus which comprises a U-shaped core of magnetic material and a pair of coils, comprising with the core an electromagnetic structure, individually disposed on respective ones of the legs of the core and connected in series flux-aiding relationship. The pair of coils is responsive to dynamic convergence signals of predetermined frequency applied across the free ends of the coils for developing a convergence magnetic field between the free ends of the legs. Each one of the coils has an effective inductive reactance and distributed capacitance which together constitute a parallel circuit resonant at a second predetermined frequency. Included in the convergence apparatus, in accordance with the invention, is energy dissipating means coupled individually to each one of the pair of coils for reducing current flow therein at the second predetermined resonant frequency.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

Figure 1:
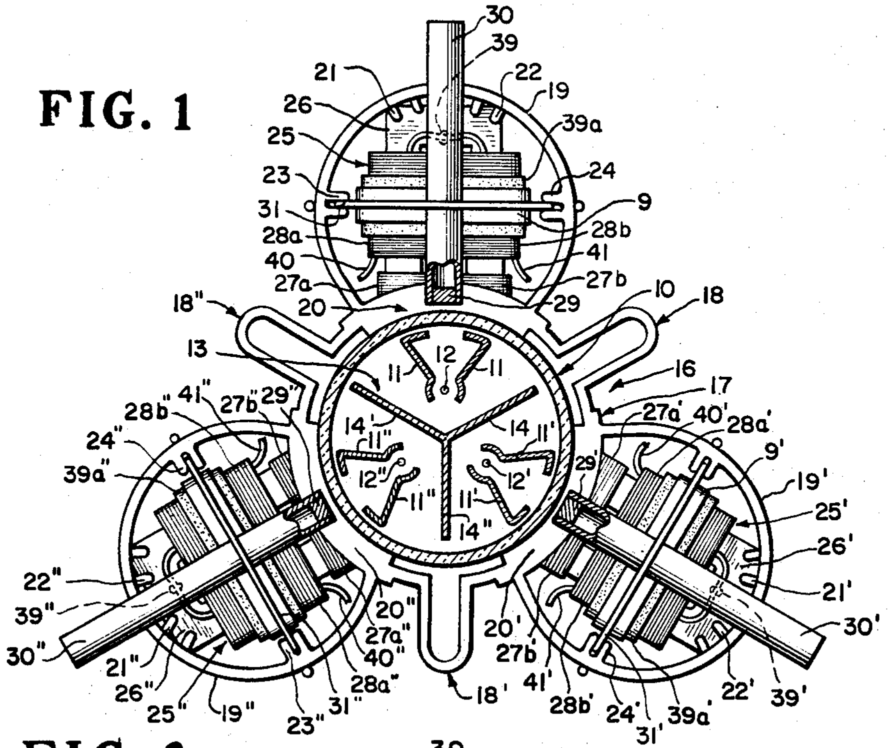
FIGURE 1 is an elevational view, partly in section, of convergence apparatus embodying the invention.

Referring to FIGURE 1, convergence apparatus is shown mounted on the neck 10 of a multibeam cathode-ray tube such as a conventional tribeam color picture tube. In cathode-ray tubes of this type, the cylindrical axis of the neck of the tube is generally coincident with the geometric axis of symmetry of the entire tube. Within the neck portion of the cathode-ray tube, pairs of metallic pole pieces 11, 11' and 11'' are spaced symmetrically about the aforementioned cylindrical axis. Electron beams 12, 12' and 12'' are emitted from respective electron guns (not shown) and are directed in such a manner so as to pass between the respective pairs of internal pole pieces 11, 11' and 11''. A magnetic shield 13 is employed to prevent interaction of the magnetic fields created in the respective pairs of pole pieces. This magnetic shield is constructed of ferromagnetic members 14, 14' and 14'' radially extending from the tube axis between adjacent pairs of internal pole pieces 11, 11' and 11'' in conventional fashion.

The apparatus includes a molded one-piece yoke or support member 16 comprising a collar 17, three resilient bight portions 18, 18' and 18'' and three resilient retaining members in the form of arcuate lobes 19, 19' and 19''. Collar portion 17 of support member 16 is constructed of three identical segments 20, 20' and 20'' each of a curvature conforming to that of neck 10 and symmetrically interspaced with the resilient bight portions 18, 18' and 18''. Integral with collar segments 20, 20' and 20'' are respective retaining members constructed as arcuate lobes 19, 19' and 19'' which extend outwardly from the collar. Integral with and extending inwardly from lobe 19 are two pairs of indexing projections 21 and 22 as well as guide channels 23 and 24 which may for convenience be constructed as similar pairs of projections. The unitary support member complete with collar, bight portions, lobes, projections, and guide channels is often molded of a suitable plastic material such as nylon.

Each lobe embraces identical structure identified in the drawing by corresponding primes and double primes; it will suffice to describe one lobe assembly. An electromagnet structure 25 which forms a part of the magnetic convergence device is resiliently retained by the unitary support member 16 within arcuate lobe 19. Electromagnet structure 25 is constructed of a U-shaped core 26 of magnetic material on which is wound a pair of horizontal dynamic convergence coils 27*a* and 27*b* and a pair of vertical dynamic convergence coils 28*a* and 28*b*. Coils 28*a* and 28*b* are connected in series at terminal 39 and are so wound as to be in flux-aiding relationship. The free ends of coils 28*a* and 28*b* terminate in respective terminals 40 and 41.

Associated with electromagnet structure 25 is a diametrically polarized cylindrical permanent magnet 29 housed in a tubular retainer 30 of cardboard or the like. A generally U-shaped wire spring 31 secures tubular retainer 30 and its magnet 29 against lobe 19 and collar segment 20 in predetermined spatial relation relative to electromagnet 25, while allowing for rotational adjustment thereof. The aforementioned spatial relation is such that the flux created by magnets 29 and 25 traverses the internal pole pieces 11 when the convergence yoke assembly is mounted on neck 10.

A detailed description of this particular kind of convergence structure and its operation and adjustment is presented in U.S. Patent No. 3,138,730, entitled "Convergence Device for Color Television," issued to C. H. Heuer and J. L. Rennick on June 23, 1964, and assigned to the same assignee as is the present application.

In the operation of the apparatus as thus far described, the electron beams pass between the respective pairs of internal pole pieces. Magnetic fields within these pole pieces, being generally perpendicular to the direction of electron motion, cause a resultant lateral deflection of the beam which is proportional to the strength of the impressed magnetic field. By suitably adjusting the impressed magnetic field strengths individually and with respect to each other, the beams can be directed so as to converge at a given point or points on the luminescent screen. With no signal applied to the dynamic convergence coils, the only flux passing through these pole pieces is that created by permanent magnet 29, which is varied in orientation to establish the required condition of static convergence, as described fully in the aforesaid Heuer et al. patent.

The dynamic convergence coils which form a part of the electromagnets are used to provide dynamic convergence in a conventional manner. The two pairs of coils 27*a*, 27*b* and 28*a*, 28*b* respond to applied dynamic convergence signals which vary as functions of the horizontal and vertical scanning signals, respectively, to establish an appropriate combined time-varying magnetic field in each set of internal pole pieces. The dynamic convergence signals are developed in convergence circuitry such as that described in Patent No. 3,141,109, entitled "Color Television Convergence Circuit," issued to J. F. Chandler on July 14, 1964, and assigned to the same assignee as is the present application. The vertical dynamic convergence signal is applied across terminals 40 and 41. Coils 28*a* and 28*b* respond to the signal to develop the vertical convergence field across the free ends of the legs of U-shaped core 26, as also described fully in the Heuer et al. patent.

In accordance with the invention, the apparatus further includes energy dissipation means coupled individually to each one of the coils for reducing current flow therein at a frequency different from that of the convergence signals applied to those coils. As embodied in FIGURES 1 and 2, this energy dissipitation is accomplished by the inclusion of a closed conductive loop or band 9 wound about electromagnetic structure 25. Conductive band 9 encircles the pair of vertical dynamic convergence coils 28*a* and 28*b* at approximately their midpoints. Band 9 is not in galvanic contact with coils 28*a* and 28*b* which are protected and bound, as is conventional, by an insulating, nonconductive cover 39*a*.

Figure 3:
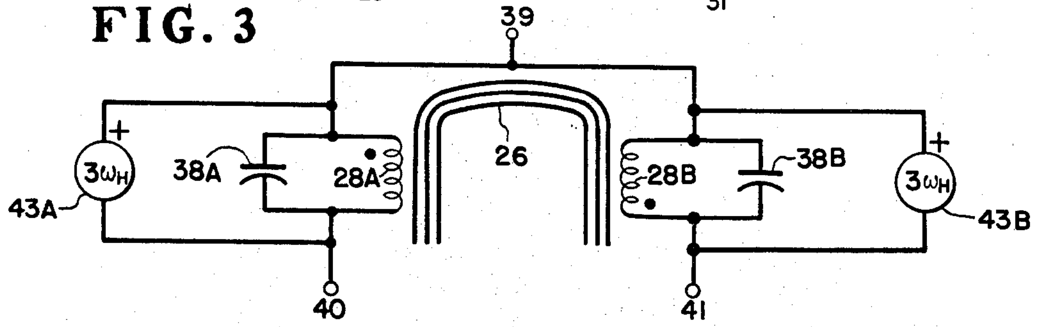
FIGURE 3 is a schematic diagram of an equivalent circuit of part of the apparatus shown in FIGURES 1 and 2.

In order to understand the function of band 9 it is necessary to understand the nature of the cause of the distortion for which its inclusion constitutes a cure. This can best be understood with reference to the equivalent circuit of FIGURE 3. Each coil has an effective inductance respectively represented by inductances 28A and 28B. Also associated with the coils is a distributed capacitance schematically represented by capacitances 38A and 38B. Inductances 28A and 28B of coils 28*a* and 28*b* are connected as shown by the conventional notation to be flux-aiding. Coils 28*a* and 28*b* are joined at terminal 39 and have free ends which constitute terminals 40 and 41. Also depicted in FIGURE 3 across the coil inductances respectively from terminals 40 to 39 and from terminal 41 to 39 are voltage generators 43A and 43B. The generator signals are of such polarity as to buck or substract from one another as measured across terminals 40 and 41.

Generators 43A and 43B are schematic representations of voltages included in physical coils 28*a* and 28*b* by flux magnetically coupled from the sweep field generating coils (not shown) which are physically situated in present day color television receivers in close proximity to the convergence apparatus. This flux has been found to include a component at a harmonic of the horizontal raster sweep frequency. In one particular structure, it has been determined to be the third harmonic. For clarity, band 9 has not been indicated in FIGURE 3; however, it constitutes a shorted turn encircling coils 28*a* and 28*b* together.

Each of the coils 28*a* and 28*b* in the aforesaid particular structure constitutes a parallel resonant circuit at the third harmonic of the horizontal sweep frequency; this is typically about 45 kilocycles. In the case of coil 28*a*, this circuit includes the effective inductance 28A of the coil and the parallel distributed capacitance 38A. Coil 28*b* likewise includes a parallel resonant circuit represented by inductance 28B and distributed capacitance 38B.

In effect, coils 28*a* and 28*b* act as an amplifier of the third harmonic sweep field. The two resonant circuits cause the third harmonic flux to be induced into core 26 directly from each of coils 28*a* and 28*b*, but such flux substantially cancels in the core since the potential developed by the sweep field in one coil is in opposition to the potential developed thereby in the other. However, a portion of the leakage or return flux from each of coils 28*a* and 28*b* cuts directly through the electron beam path. It is the third harmonic content in this leakage flux in a path outside core 26 which causes the unwanted distortion. It may be noted that the third harmonic potential in the convergence coils can effectively be detected only by measurement individually across the two coils.

The function of the energy dissipating means, such as band 9, coupled individually to each one of said pair of coils is to reduce current flow in the coils at the third harmonic resonant frequency. Being wound only about the two coils together and not about them individually, band 9 acts upon the leakage flux generated by the resonance of the individual coil circuits at the induced third harmonic frequency and does not effect development of the desired convergence field from coils 28*a* and 28*b*. That is, band 9 responds as a shorted turn to the third harmonic flux cutting it. The convergence signal impressed across terminals 40 and 41, and therefore across coils 28*a* and 28*b* in series, causes the desired flux to be individually generated by each coil and these fluxes add; the net desired flux cutting band 9 is nil, since the two coils are coupled with opposite polarities in parallel with respect to band 9 as to the desired flux. At the same time, as to the undesired third harmonic flux, the two coils are coupled with like polarities in parallel with respect to band 9. As a result, the third harmonic flux from the coils is induced additively in the band and the latter acts as a shorted turn and absorbs the undesired flux. As a shorted turn, band 9 generates a counter flux field in response to the third harmonic flux change. Band 9, therefore counters the undesired leakage flux component which otherwise would cause the above-described raster distortion. Instead of a single band as shown, the same effect may be had by using a few turns of ordinary copper wire wound about the magnetic structure in place of band 9 and electrically joined at the free ends to constitute a closed multiturn loop.

Figure 2:
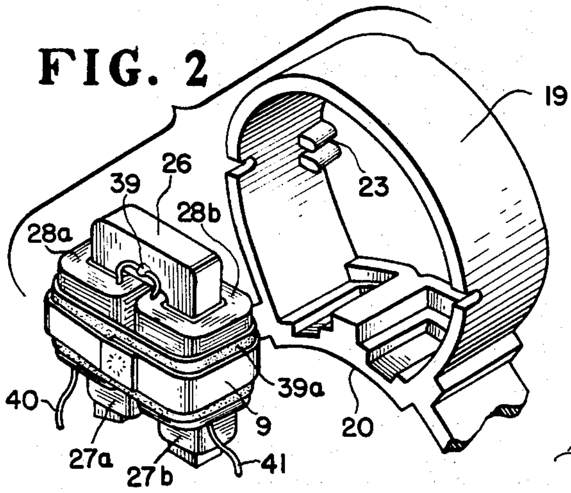
FIGURE 2 is a perspective exploded view of a portion of the apparatus shown in FIGURE 1.
Figure 4:
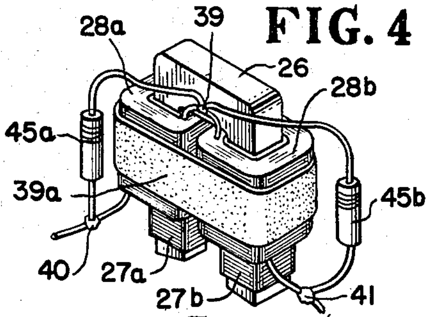
FIGURE 4 is a perspective view of apparatus incorporating an alternative embodiment of the invention.

In the alternative embodiment illustrated in FIGURE 4, structure 25 is identical to that shown in FIGURES 1 and 2. In this instance band 9 is replaced by a pair of resistors 45*a* and 45*b* individually connected across respective ones of coils 28*a* and 28*b*. This is effected by physically connecting the resistors across terminals 39, 40 and 39, 41, respectively. Resistors 45*a* and 45*b* damp the oscillations in the above described resonant circuits at the third harmonic frequency. At the same time, the resistance value for this purpose is not so low as to appreciably shunt the desired convergence current flowing in coils 28*a* and 28*b*. In a typical working structure, resistors 45*a* and 45*b* are several times the resistance of coils 28*a* and 28*b*. Exemplary values are 500Ω for each resistor and 50Ω for each of the coils.

As is now evident, the invention provides a new and improved convergence apparatus for use with a multibeam cathode-ray tube in which a form of raster distortion is materially reduced. At the same time, its implementation is economical and of simplified construction.

While particular embodiments of the present invention have been shown and described, it is apparent that changes and modifications may be made therein without departing from the invention in its broader aspects. The aim of the appended claims, therefore is to cover all such changes and modifications as fall within the true spirit and scope of the invention.

We claim:

1. Convergence apparatus comprising:
a U-shaped core of magnetic material;
a pair of coils, comprising with said core an electromagnetic structure, individually disposed on respective ones of the legs of said core and connected in series flux-aiding relationship, responsive to dynamic convergence signals of a predetermined frequency supplied across the free ends of said coils for developing a convergence magnetic field between the free ends of said legs, each one of said coils having an effective inductive reactance and distributed capacitance which together constitute a parallel circuit resonant at a second predetermined frequency;
and energy dissipating means coupled individually to each one of said pair of coils for reducing current flow therein at said second predetermined frequency.

2. Convergence apparatus comprising:
a U-shaped core of magnetic material;
a pair of coils, comprising with said core an electromagnetic structure, individually disposed on respective ones of the legs of said core and connected in series flux-aiding relationship, responsive to dynamic convergence signals of a predetermined frequency for developing a convergence magnetic field between the free ends of said legs, each one of said coils having an effective inductive reactance and distributed capacitance which together constitute a parallel circuit resonant at a second predetermined frequency;
and energy dissipating means comprising a closed conductive loop wound about said electromagnetic structure for reducing current flow in each of said coils at said second predetermined resonant frequency.

3. Convergence apparatus comprising:
a U-shaped core of magnetic material;
a pair of coils, comprising with said core an electromagnetic structure, individually disposed on respective ones of the legs of said core and connected in series flux-aiding relationship, responsive to dynamic convergence signals of a predetermined frequency applied across the unconnected ends of said coils for developing a convergence magnetic field between the free ends of said legs, said coils each having inductive reactance and distributed capacitance which together constitute a parallel circuit resonant at a second predetermined frequency;
and energy dissipating means comprising a closed conductive band encircling said electromagnetic structure and magnetically coupled individually to each of said coils for reducing current flow therein at said second predetermined frequency.

4. Convergence apparatus comprising:
a U-shaped core of magnetic material;
a pair of coils, comprising with said core an electromagnetic structure, individually disposed on respective ones of the legs of said core and connected in series flux-aiding relationship, responsive to dynamic convergence signals of a predetermined frequency applied across the unconnected ends of said coils for developing a convergence magnetic field between the free ends of said legs, said coils each having inductive reactance and distributed capacitance which together constitute a parallel circuit resonant at a second predetermined frequency;
and energy dissipating means comprising a pair of damping resistors individually connected across respective ones of said coils for reducing current flow therein at said second predetermined resonant frequency.

5. Convergence apparatus comprising:
a U-shaped core of magnetic material;
a pair of coils, constituting with said core an electromagnetic structure, individually disposed on respective ones of the legs of said core and connected in series flux-aiding relationship, responsive to dynamic convergence signals of predetermined frequency applied across the unconnected ends of said coils for developing a convergence magnetic field between the free ends of said legs;
and a closed conductive loop wound about said electromagnetic structure.

6. Convergence apparatus comprising:
a U-shaped core of magnetic material;
a pair of coils, constituting with said core an electromagnetic structure, individually disposed on respective ones of the legs of said core and connected in series flux-aiding relationship, responsive to dynamic convergence signals of predetermined frequency applied across the unconnected ends of said coils for developing a convergence magnetic field between the free ends of said legs;
and a closed conductive loop wound about said electromagnetic structure encompassing both of said coils and said legs of said core.

7. Convergence apparatus comprising:
a U-shaped core of magnetic material;
a pair of coils, individually disposed on respective ones of the legs of said core and connected in series flux-aiding relationship, responsive to dynamic convergence signals of a predetermined frequency for developing a convergence magnetic field between the free ends of said legs;
and a pair of damping resistors individually connected across respective ones of said coils.

8. Convergence apparatus comprising:
a U-shaped core of magnetic material;
a pair of coils, individually disposed on respective ones of the legs of said core and connected in series flux-aiding relationship, responsive to dynamic convergence signals of a predetermined frequency for developing a convergence magnetic field between the free ends of said legs;

and a pair of damping resistors individually connected across respective ones of said coils, said resistors having a resistance several times greater than said coils.

9. Convergence apparatus, mounted on the neck of the cathode-ray tube of a color television receiver having dynamic convergence signal generating circuitry and sweep signal generating circuitry which applies a sweep signal to magnetic scanning field producing coils mounted on said cathode-ray tube near said convergence apparatus and productive of a field at a harmonic of said sweep signal, comprising:

a U-shaped core of magnetic material;

a pair of coils, individually disposed on respective ones of the legs of said core, connected in series flux-aiding relationship and responsive to dynamic convergence signals from said dynamic convergence signal generating circuitry applied across the free ends of said coils, for developing a convergence magnetic field between the free ends of said legs, said coils having leakage flux and distributed capacitance which with the inductance of each one of said coils constitutes a parallel circuit resonant at said harmonic of said sweep signal and said coil pair being coupled to said scanning field producing coils;

and a closed conductive loop wound about said magnectic structure neutralizing the leakage flux field generated by said pair of coils in response to said harmonic field from said scanning field producing coils.

10. Convergence apparatus, mounted on the neck of the cathode-ray tube of a color television receiver having dynamic convergence signal generating circuitry and sweep signal generating circuitry which applies a sweep signal to magnetic scanning field producing coils mounted on said cathode-ray tube near said convergence apparatus and productive of a field at the third harmonic of said sweep signal, comprising:

a U-shaped core of magnetic material;

a pair of coils, individually disposed on respective ones of the legs of said core, connected in series flux-aiding relationship and responsive to dynamic convergence signals from said dynamic convergence signal generating circuitry applied across the free ends of said coils, for developing a convergence magnetic field between the free ends of said legs, said coils having leakage flux and distributed capacitance which with the inductance of each one of said coils constitutes a parallel circuit resonant at said third harmonic of said sweep signal and said coil pair being coupled to said scanning field producing coils;

and a closed conductive loop wound about said magnetic structure neutralizing the leakage flux field generated by said pair of coils in response to said third harmonic field from said scanning field producing coils.

11. Convergence apparatus, for use on a color kinescope having a yoke which develops horizontal and vertical scanning fields, comprising:

a U-shaped core of magnetic material;

a pair of coils, comprising with said core an electromagnetic structure, individually disposed on respective ones of the legs of said core and connected in series flux-aiding relationship, responsive to dynamic convergence signals at the frequency of said vertical scanning field applied across the free ends of said coils for developing a vertical convergence magnetic field between the free ends of said legs, each one of said coils having an effective inductive reactance and distributed capacitance which together constitute a parallel circuit resonant at said third harmonic of the frequency of said horizontal scanning field;

and energy dissipating means coupled individually to each one of said pair of coils for reducing current flow therein of said harmonic frequency.

References Cited

UNITED STATES PATENTS

| | | | |
|---|---|---|---|
| 2,880,364 | 3/1959 | Kolesnik et al. | |
| 3,088,046 | 4/1963 | Reiches | 313—77 |
| 3,138,730 | 6/1964 | Heuer et al. | 313—77 |

RODNEY D. BENNETT, *Primary Examiner.*

M. F. HUBLER, *Assistant Examiner.*